UNITED STATES PATENT OFFICE 2,031,412

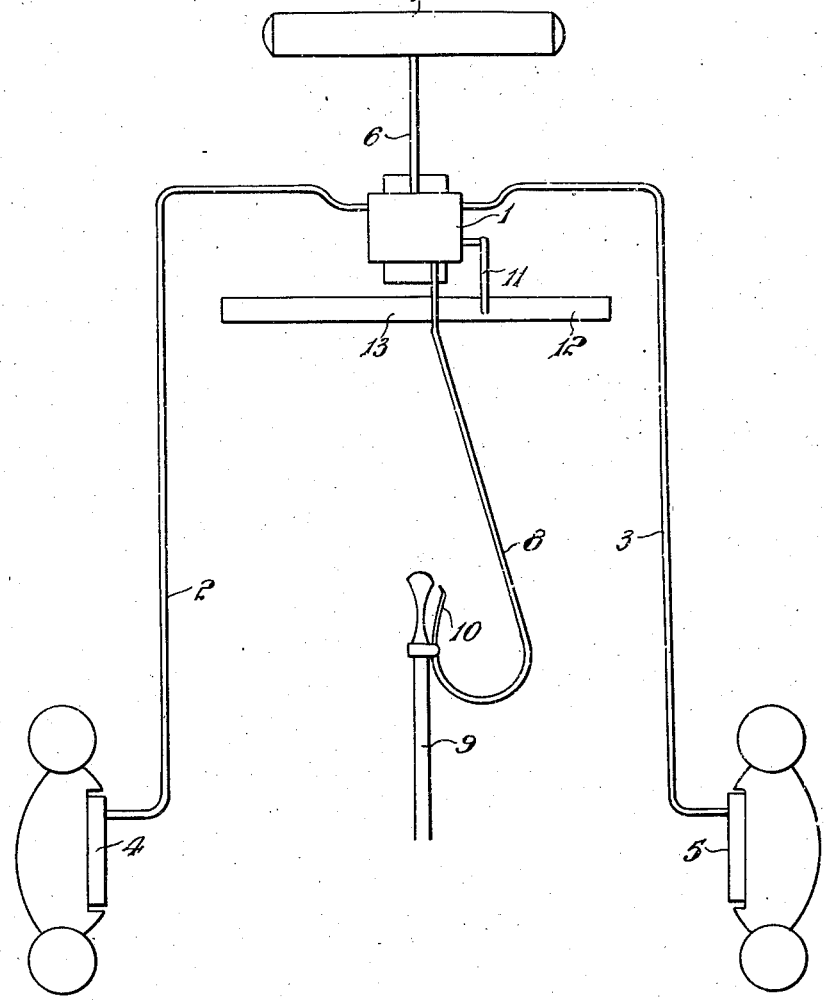

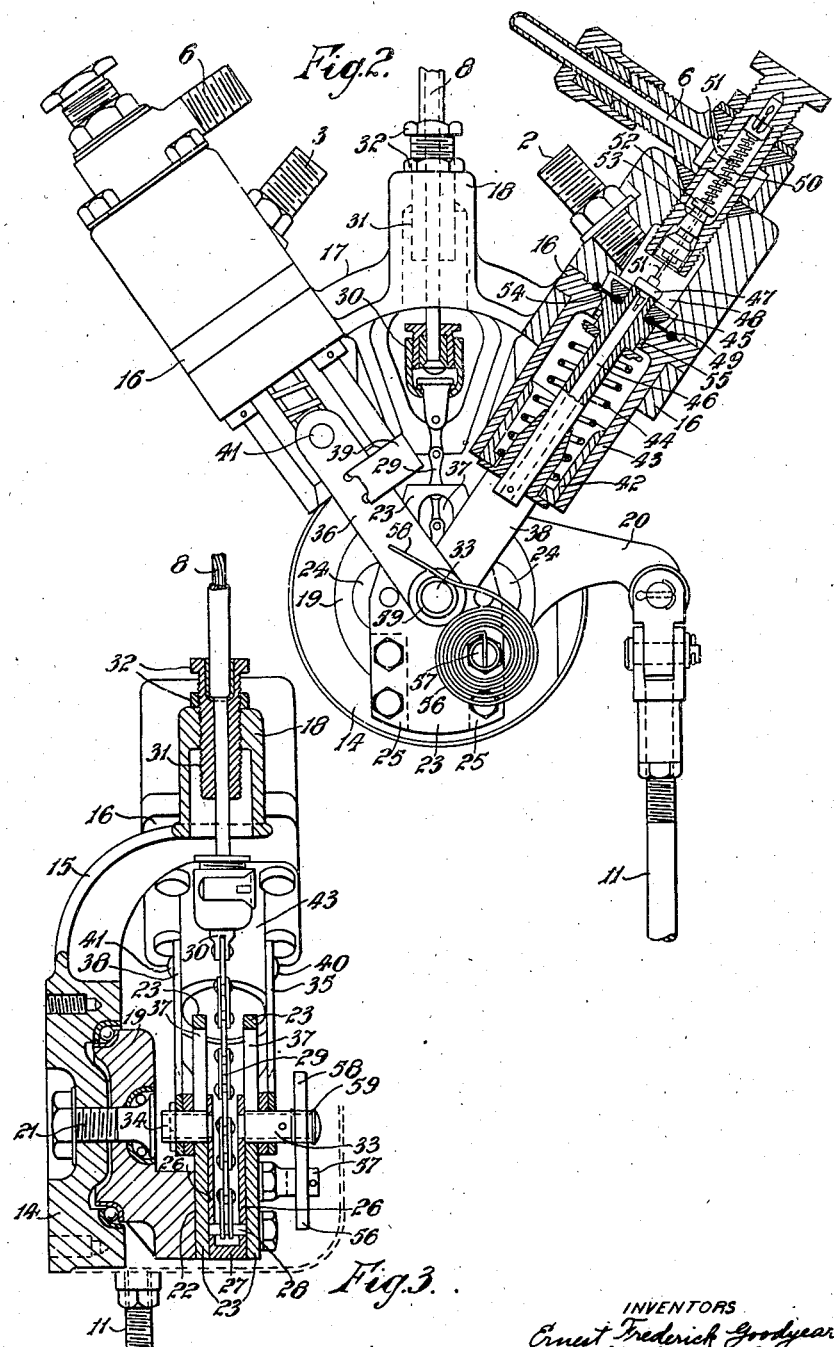

AIRCRAFT BRAKE CONTROL MECHANISM

Ernest Frederick Goodyear, Moxhall Park, Wishaw, and Joseph Wright, Stoke Park, Coventry, and Henry Trevaskis, Keresley, Coventry, England, assignors to Dunlop Rubber Company Limited, London, England, a British company Application March 9, 1935, Serial No. 10,144
In Great Britain March 14, 1934

6 Claims. (Cl. 244—2)

This invention concerns improvements in the aircraft brake apparatus described and claimed in our prior Patent No. 1,917,933.

The object of the present invention is to provide a construction which is simpler and lighter than that shown in the parent patent and which also requires less space.

According to this invention brake apparatus is characterized by pneumatic relays, each containing a plurality of valves actuated simultaneously by converging links pivoted to a pair of coaxial and spaced spindles constituting a common actuating member displaceable along rotatable guideways by a flexible connection extending between the spaced spindles and guideways.

In order that the invention may be more easily understood and readily carried into effect, the same will now be described with reference to the accompanying drawings, in which—

Fig. 1 is a diagrammatic representation of the general arrangement of a brake system incorporating the present invention.

Fig. 2 is a part sectional plan view of the invention.

Fig. 3 is a part sectional side elevation of the invention.

In the general arrangement shown diagrammatically in Fig. 1, the improved valve mechanism constituting the present invention is shown at 1 and is operatively connected by fluid transmitting pipes 2 and 3 to the brake drum mechanism 4 and 5 in the wheels of the under carriage.

The valve mechanism 1 is also connected by a pipe or pipes 6 to an air bottle 7 or other suitable source of compressed air, by the release of which the brake mechanism in the brake drums is ultimately operated.

The valve mechanism is operated by mechanical connections, one of which is a sheathed cable 8, one end of which may be connected to the principal flying control 9 for actuation by a finger lever 10.

The other mechanical connection consists of a link 11, one end of which moves a steering arm projecting from the valve mechanism, the other end being attached to a rudder bar 12 pivoted at its center 13.

Referring to Figs. 2 and 3, the cast light weight metal body portion of the valve mechanism includes a flat circular base 14 from which radiate a pair of arms 15, Fig. 3, of equal length which curve upwards and terminate in brackets 16. The arms 15 are united by an arcuate bridge 17, Fig. 2, which merges into the bracket at each end, the bridge being perforated at the center and cast with a bulbous projection 18.

The axis of symmetry of the valve mechanism passes through the aperture in the bulbous projection and through the center of the circular base portion 14, and the axes passing through each of the brackets 16 also pass through the center of the circular base 14 so that the axis of symmetry bisects the angle between the axes of the relays.

Rotatably centered in the circular base 14 is a guideway mounting 19 of circular shape, one side of which is extended at 20, Fig. 2, to constitute a crank, the free end of which is connected by the link 11, Fig. 2, to the rudder bar 12, Fig. 1.

The guideway mounting 19 rotates upon the base 14 about a nut and bolt 21, Fig. 3, the head of which is flared to constitute one part of a ball race, the other part being provided by recessing the mounting 19; and the guideway mounting also rotates about a ball race formed between curved surfaces recessed into the mounting and into the base 14 on its under side.

The nut upon the lower or free end of the bolt lies within a central recess in the under side of the base casting 14.

The surface of the rotatable guideway mounting 19 is stepped at its outer diameter to provide a seating surface 22, Fig. 3, to which are clamped two superposed and spaced tongue shaped members 23 which are slotted centrally to constitute a guideway having two guiding channels superimposed in register one above the other when the apparatus is used in a position corresponding to that shown in Fig. 3.

The double guideway so formed is clamped at one end to the surface 22 on the mounting 19, but the slotted guides 23 are not otherwise inter-connected so that the space between them is left clear for other working parts.

Between the slotted tongues of the guideway and adjacent the ends of the tongues which are clamped to the rotatable mounting are a pair of rollers 24, Fig. 2, one on each side of the central axis, the rollers revolving about vertical spindles, the ends of which are located in holes in the upper and lower slotted members of the guideway.

As long as the rudder bar and rudder are not deflected, the guideway is not rotated, and coincides with the axis of symmetry, but when the pilot deflects the rudder bar and rudder by movement of his feet, the link 11 connected to the arm 20 partly rotates the guideway, thereby moving the slotted tongues with a clockwise or anticlockwise movement so that the guideway is deflected to one side or the other from the axis of symmetry and may even coincide with the axis of one of the relays.

In the vertical space between the upper and lower slotted tongues 23, Fig. 3, of the guideway and between the spaced blocks 25 shown in dotted lines in Fig. 2, are a pair of vertically spaced elongated plates 26, Fig. 3, which rotate with the guideway and which may also be displaced longitudinally along it according to the position it has been caused to take up by deflection of the rudder bar. These elongated plates 26 are also spaced vertically apart when the valve mechanism is in the position shown in Fig. 2, and these plates 26 may be formed integral with a spacing member 27, Fig. 3, which slides between the blocks 25, Fig. 2.

An abutment spindle 28, Fig. 3, which extends between the plates 26, Fig. 3, forms an attachment for the end of a short length of flexible chain 29, the other end of which is connected to the cable 8 which may be connected to the flange lever 10 on the main air control lever.

The junction of the chain and cable is effected at 30 by a pair of inter-threading tubular members to which the necessary freedom of movement is given by the tubular portion 18 cast in the center of the bridge 17, and the sheath of the cable is suitably secured to the outer end of a threaded sleeve 31, Fig. 2, the inner end of which extends within the tubular part 18 to an extent adjustable by the nuts 32.

The innner end of the sleeve 31 thus becomes a stop which prevents the movement of the cable from exceeding that required in the operation of different kinds of wheel brake mechanism.

The ends of the plates 26 remote from their spacing portion 27 each carries one of the adjacent ends of a pair of coaxial spindles 33, 34, Fig. 3, which are spaced apart so that when the guideway is partly rotated there is no contact with the chain.

The lower or left hand end of the upper spindle 33 shown in Fig. 3, seats in an aperture in one of the plates 26, and coaxial with this but spaced therefrom is the upper end which is at the right hand end of the spindle 34 shown in Fig. 3, which seats in a similar aperture in the lower of the two plates 26.

The stem part of the spindle 33 passes through the elongated slot 37 in the adjacent guideway and through circular apertures in two pairs of diverging links which are operatively connected to the pneumatic valve relays.

The left hand link 36 shown in Fig. 2 is one of two similar and divergent links, but the link 38, Figs. 2 and 3, is one of the lower links having an upper corresponding counterpart in link 35 shown in Fig. 3.

The stem of the lower spindle 34 passes in similar manner to the upper spindle 33 but in the opposite direction through the lower of the two slots 37 and through a lower pair of diverging links which register with those above.

One of these lower links has already been referred to above at 38 in Fig. 2, and this link corresponds, as already stated, to the upper link 35 of Fig. 3. The left hand lower link, however, is concealed in Fig. 2 by its upper counterpart 36, Fig. 2.

When the chain 29 is tensioned, the pull on the abutment spindle 28 moves the plates 26, Fig. 3, from the position shown in the drawings along the central axis guided between the blocks 25, Fig. 2, so carrying the coaxial spindles 33 and 34 with them.

In consequence, the actuating valve link 35 and its lower counterpart 38, Fig. 3, are moved outwards from the axis of symmetry and the link 36, together with its hidden counterpart, are also moved to an equal degree.

The links 35 and 36 and their lower counterparts are, however, unequally displaced when the guideway is deflected to one side or the other on application of the rudder.

One pair of links extends towards each bracket carrying the corresponding valve body and its mechanism, and each of these pairs is held together by a spring clip 39, one of which is shown in Fig. 2.

The pneumatic relay valve mechanisms are identical in construction and operation and a description of one applies also to the other.

Each superposed pair of vertically spaced links, Fig. 2, extend from their respective actuating spindles 33 and 34, and projections 40 and 41, Fig. 3, are pressed by a clip similar to that at 39, Fig. 2, into recesses in a cup 42, Fig. 2 which slides between two circular plates 43, Fig. 2, positioned in the brackets 16.

As shown in Fig. 2, the circular plates 43 contain a compression coil spring 44, the end of the spring nearest the base 14 bearing upon the inner surface of the cup 42. The other end of the spring 44 presses through a washer upon a two part cylindrical member 45 through the center of which passes an exhaust tube 46 round which centers the spring 44.

The end of the tube 46 nearest the base 14 is open to atmosphere but moves as one with the member 45 in which the other end of the tube is housed. The other or outer end of the tube 46 passes through the member 45 which is displaceable into contact with a disc of rubber 47 constituting an exhaust stop valve.

A second valve 52 acting as an inlet stop valve to the compressed air supply is not only normally pressed against its seat 53 by the small spring 50, but also by the air under pressure in the pipe line 6 leading to the air bottle, air screw or other supply of fluid pressure.

Normally the spring 44 is uncompressed and the stop valve disc 47 does not then quite seal the end of the exhaust tube, but when the coil spring 44 is compressed, the exhaust valve 47 is sealed by the distortion of a diaphragm 49 which, in turn, opens valve 53 which is on the same spindle 51 as valve 52 and so permits the entry of compressed air from the air bottle until air so released builds up in pressure in the chamber 48 until the resultant load upon the face of the carrying member 45 equals that applied by the pilot to the spring 44.

The pilot is thus always made aware of the pressure he is applying by the effort required to contract the finger lever, but in order to reduce the necessary muscular effort we provide a conical surface at 54, Fig. 2, so that when the member 45 is driven back on the spring 44, a substantial portion of the lead is always taken by the deformation of the diaphragm upon this fixed conical support surface.

When the finger lever 11 is released, the back pressure from the air trapped in the brake drums and brake pipe lines displaces the member 45, Fig. 2, to a degree allowed for by stepped surfaces 55, Fig. 2, thus unseating the exhaust stop valve, whereupon exhaust to atmosphere takes place through the tube 46, the end of which is unsealed.

To overcome friction and to ensure the return of the various links to their fully inoperative position, we also provide a coil spring 56, Figs. 2 and 3, carried on a stud 57, Fig. 2 and Fig. 3, centered off the axis of symmetry, the spring having a tail 58, Figs. 2 and 3, bearing on a pulley 57, Figs. 2 and 3, journalled on the upper end of the spindle 33, the tail of the spring contacting the stud at an angle such that only side pressure is exerted during the initial displacement of the spindles 33 and 34, but increasing rearward pressure is exerted when the spindles are returning to the inoperative position shown.

What we claim is—

1. Aircraft brake control mechanism comprising a plurality of fluid pressure control relays, a pair of spaced guides, actuating means slidable between and guided by said guides, links connecting said actuating means to said brake mechanism, means to rotate said guides as a unit on an axis perpendicular to the plane of movement of said links, means extending between the guides perpendicular to said axis of rotation of said guides for moving said actuating means, and comprising flexible elements, spaced spindles slidable in said guides, an abutment spindle connected to said flexible elements, a pair of plates carrying said abutment spindle and in which one end of one of each of the spaced spindles is fastened to move between lateral guideway surfaces of said guides.

2. Aircraft brake control mechanism comprising a plurality of fluid pressure control relays, a pair of spaced guides, actuating means slidable between and guided by said guides, links connecting said actuating means to said brake mechanism, means to rotate said guides as a unit on an axis perpendicular to the plane of movement of said links, means extending between the guides perpendicular to the axis of rotation of said guides for moving said actuating means and a coil spring centered off the axis of symmetry which extends between the pneumatic relays, the said spring having a tail exerting positive withdrawal pressure on the slidable actuating means when tension on the operative connection is released.

3. Aircraft brake control mechanism comprising a plurality of fluid pressure control relays, a pair of spaced guides, actuating means slidable between and guided by said guides, links connecting said actuating means to said brake mechanism, means to rotate said guides as a unit on an axis perpendicular to the plane of movement of said links and means extending between said guides perpendicular to said axis of rotation of said guides for moving said actuating means, said relays each comprising a valve, a flexible diaphragm and a fixed conical surface to support said flexible diaphragm in part.

4. Aircraft brake control mechanism comprising a plurality of fluid pressure control relays, a pair of spaced guides, slidable between and guided by said guides, links connecting said actuating means to said brake mechanism, means to rotate said guides as a unit on an axis perpendicular to the plane of movement of said links, means extending between the guides perpendicular to the axis of rotation of said guides for moving said actuating means, valve casings having diaphragms exposed to pressure in said casings and in which said links move said diaphragms against pressure within said valve casings, said valve casings having conical surfaces to support said diaphragms in part.

5. Aircraft brake control mechanism comprising a plurality of fluid pressure control relays, a pair of spaced guides rotatable as a unit, actuating means slidable between and guided by said guides, links connecting said fluid pressure relays to said actuating means and forming an angle at said actuating means, a connection from said actuating means extending between the angle formed by said links and between said guides, said guides being open in a direction outwardly from the connection of said links to permit the passage of said connection, and means to rotate said guides.

6. Aircraft brake control mechanism, which comprises a rotatable guide base, a pair of spaced guides mounted on said base and actuating means slidable between said guide, pins on said actuating means extending through said guides, pressure control relays one on each side of said rotatable guide, links extending at an angle from said pins into connection with said relays, means for rotating said guide to selected angles between said links, said pair of guides being open at the ends extending between said links and means extending longitudinally from said actuating means between said guides and through said open end thereof to move said actuating means.

ERNEST FREDERICK GOODYEAR.
JOSEPH WRIGHT.
HENRY TREVASKIS.